April 7, 1970  G. E. MICHAELS ET AL  3,505,160
LAMINATED SAFETY GLASS

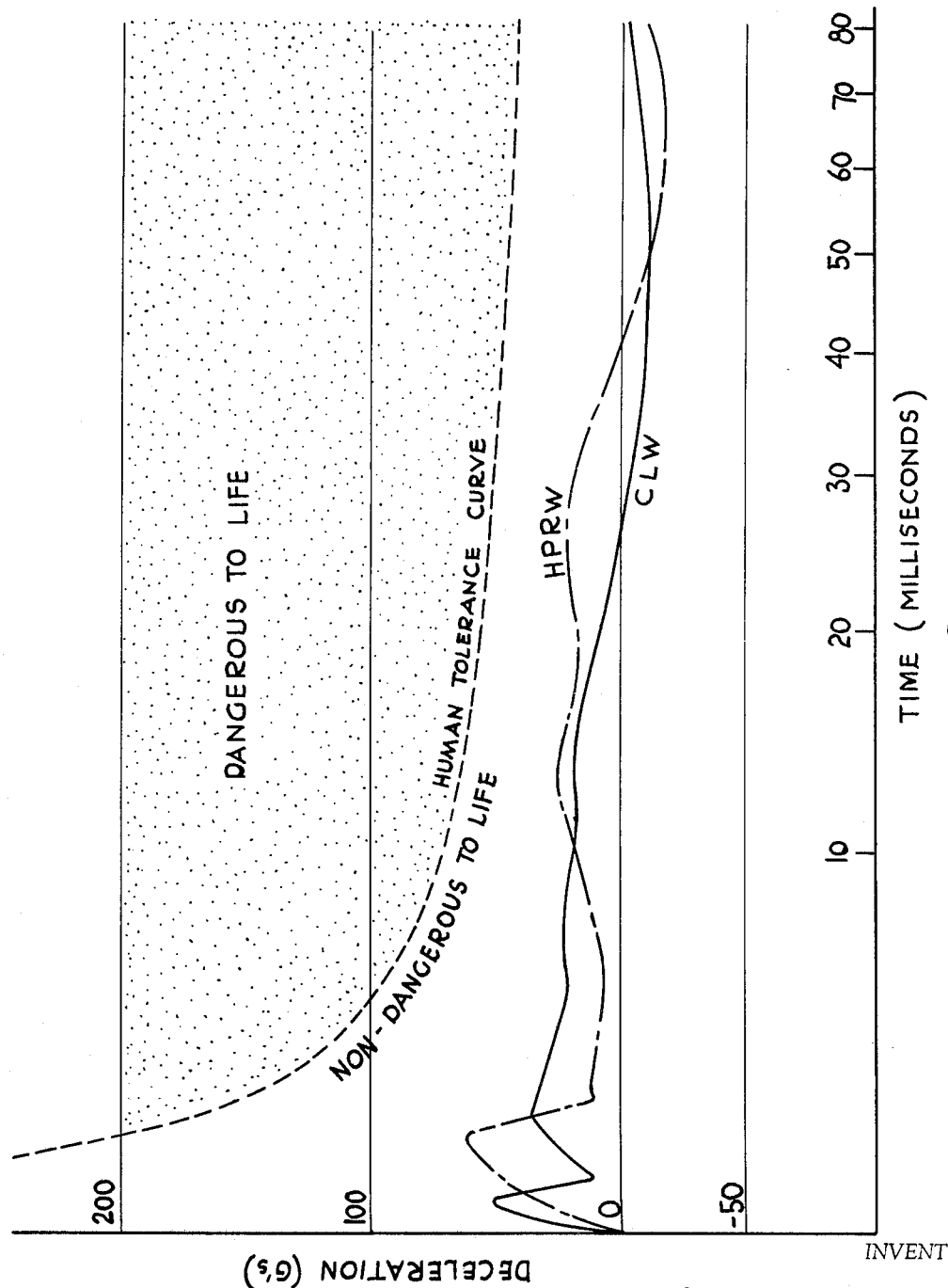

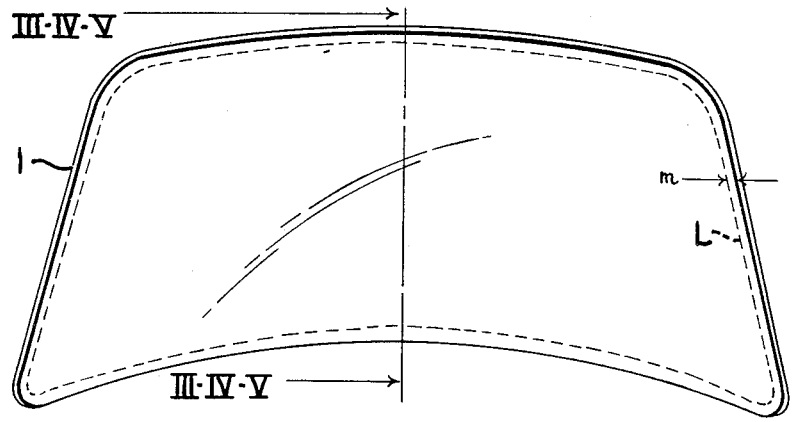
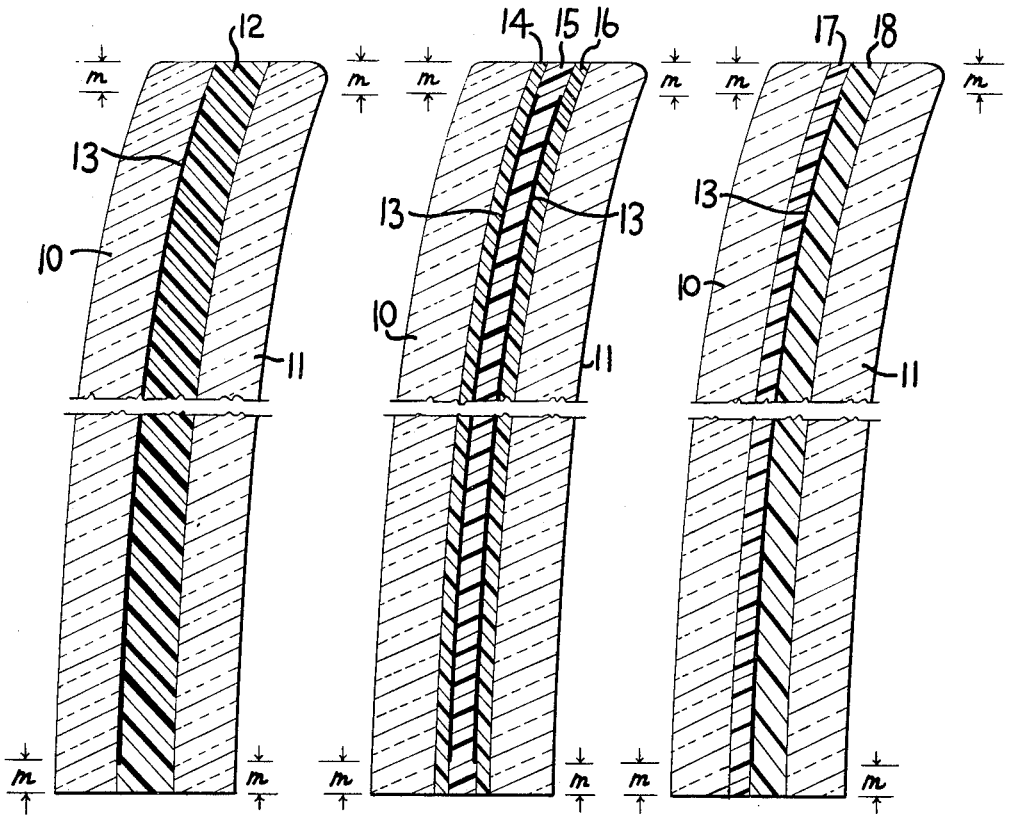

Filed Oct. 18, 1965  4 Sheets-Sheet 3

INVENTORS
GEORGE E. MICHAELS and
RAYMOND G. RIESER

BY Chisholm and Spencer
ATTORNEYS

United States Patent Office 3,505,160
Patented Apr. 7, 1970

3,505,160
LAMINATED SAFETY GLASS
George E. Michaels, Wilkinsburg, and Raymond G. Rieser, Lower Burrell, Pa., assignors to PPG Industries, Inc., a corporation of Pennsylvania
Filed Oct. 18, 1965, Ser. No. 497,042
Int. Cl. B32b 7/14
U.S. Cl. 161—147                                  15 Claims

ABSTRACT OF THE DISCLOSURE

A safety laminated windshield comprising at least two glass sheets and a flexible interlayer with a marginal portion tightly bonded together and at least part of the interior surrounded by the marginal portion having less adhesion between adjacent sheets of said windshield.

---

This invention relates to improvements in laminated glazing and more particularly to safer, transparent, laminar structures for use as windshields in vehicles and methods of manufacturing these structures.

Laminated glass is presently employed as glazing material in the windshields of automobiles, trucks, and other vehicles because it decreases the possibility that passengers carried in such vehicles will be seriously injured by the windshield or particles thereof if an accident occurs. Laminated glass consists of two or more sheets of glass bonded together by means of an elastomeric interlayer material. Polyvinyl butyral is commonly used as the interlayer because of its adhesion to glass when subjected to suitable temperatures and pressure, because it is transparent when bonded between two sheets of glass, and because of its resistance to elongation whenever an object impacts such a laminated glazing. Other interlayer materials employed more recently are polyurethane compositions, sometimes introduced as partial polymers and sometimes cast in place.

For purposes of discussion the term "interlayer" will be employed to describe the elastomeric material positioned between the plies of glass whether such material is initially positioned therebetween as a single sheet or layer of elastomer or as several sheets or layers of elastomer. It is also contemplated that the interlayer may be formed by casting a liquid resin between the glass sheets.

Laminated windshields offer two primary safety advantages. In the event of an accident, the banding which is effected between the glass and the interlayer will hold the glass particles in the same relative position, thereby preventing the possibility of injury as a result of flying glass. Holding the glass particles in the same relative position also limits the possibility of having the sharp edges of the broken glass exposed.

The other advantage is due to the physical properties of the polyvinyl butyral or other elastomers. Unlike glass and other rigid materials, an elastomer will stretch prior to rupture rather than break immediately when subjected to impact. When impacted, an elastomer will elongate, thereby absorbing energy from the impacting object and reducing the velocity of the impacting object. In many instances the velocity of the impacting object can be reduced to zero before the object penetrates the elastomer.

When polyvinyl butyral is employed as an interlayer between glass sheets, such a laminate retains some of the elastomeric properties of the polyvinyl butyral. Thus, when impacted, a windshield consisting of two sheets of glass bonded together by means of a polyvinyl butyral interlayer, will elongate in the immediate area of impact thereby absorbing energy from the object and reducing its velocity. This property of a laminated windshield will be referred to as penetration resistance for the purpose of describing the present invention.

Penetration resistance is particularly desirable in a windshield because it serves to contain passengers within the vehicle when they are thrown against and fracture the windshield. Moreover, such penetration resistance also diminishes the probability of passengers being severely lacerated by the "neck ruffle" resulting from partial penetration.

"Neck ruffle" will be employed to describe the periphery of a hole in a windshield resulting from penetration. In a conventional windshield, the "neck ruffle" consists of a number of sharp and jagged glass edges inclined at such an angle that they are capable of inflicting severe lacerations. This "neck ruffle" could, of course, inflict fatal wounds to a passenger of a vehicle who is thrown against the windshield with sufficient force to penetrate and then have his face or throat come to rest on the sharp and jagged glass edges.

It has been found that the degrees of adhesion required to produce the desired level of penetration resistance and to retain glass particles when the windshield is fractured, are to a certain degree, opposing in nature rather than complementary. That is, the ability of the interlayer to retain glass particles increases with the degree of adhesion effected during the laminating operation, whereas the penetration resistance is inversely related to an increase in adhesion. The reason for this is believed to be that the greater the adhesion between the interlayer and the glass interfaces, the more likely the interlayer material will separate along the cracks formed in the glass whenever the laminar structure is fractured. That is, with a high degree of adhesion the glass restricts the interlayer from stretching as much and absorbing a portion of the impacting energy.

On the other hand, if the adhesive force between the glass and interlayer surfaces is not too great, whenever the laminar structure is fractured, it permits the interlayer to react more independently from the glass. This lesser degree of adhesion thus permits the interlayer to absorb a greater amount of the impacting energy before the impacting object penetrates the laminated structure.

It thus appears that for safety purposes, notwithstanding the fact that safety is dependent upon the specific type of accident involved, there is an optimum degree of interfacial bonding in a laminated windshield to satisfy both the need to retain glass particles from flying and to contain passengers within the vehicle whenever an accident occurs.

Other safety advantages are also obtained through the use of laminated windshields. For example, whenever an object is propelled against the outer susrface of the windshield at sufficient velocity to break the outer sheet of glass, the interlayer and inner sheet of glass remain intact, permitting the vehicle to be driven until such time as replacement of the windshield may be convenient. Breakage of this nature sometimes occurs as a result of a speeding or passing vehicle causing a stone or other object on the surface of the road to be propelled against the windshield. With a laminated windshield, damage resulting from this type of breakage is usually limited to one or more cracks in the outer sheet of glass originating at the point of impact and extending to the edge of the windshield.

Unfortunately, if the impacting object is small and has sufficient momentum, the force of the impact may be transmitted through the interlayer to the inner sheet of glass causing fragments of the inner light of glass to break loose and be propelled toward the interior of the vehicle. This type of breakage is frequently referred to as "spalling." It results from an instantaneous concentration of force on a relatively small area of one surface of a glass sheet.

Because of the present high rate of vehicle accidents and the injuries resulting therefrom, several efforts have been made to provide a safer windshield.

One approach consists of increasing the thickness of the interlayer material and controlling the degree of adhesion between the glass and interlayer interfaces during lamination to render the interlayer capable of increased resistance to penetration.

The benefits obtained from increased interlayer thickness and controlled adhesion have been so promising that suppliers are presently providing .030 inch thick, high penetration resistant (HPR) polyvinyl butyral for use as interlayers in laminated windshields. In the following text, the abbreviation "HPR" will be employed to identify such interlayer material.

"HPR" interlayers are specially processed to provide a material having a slightly higher moisture content than the polyvinyl butyral previously employed.

The increased thickness of "HPR" interlayers (.030 inch) has further enhanced penetration resistance. Polyvinyl butyral interlayers previously employed were approximately .015 inch thick.

A specific method of controlling the moisture content of "HPR" interlayers prior to lamination and that which was employed to condition the "HPR" interlayer material utilized in the examples to be discussed hereinafter is as follows.

A moisture content within the range of 0.4 to 0.55 percent by weight has been determined to be the optimum desired to improve penetration resistance without reducing glass particle retention, thermal stability of the edges, or weathering properties to an undesirable level. "HPR" interlayer material received from suppliers has a moisture content of 0.2 to 1.2 percent by weight. This moisture content can be changed to an equilibrium moisture content within the optimum range by subjecting the interlayer to a controlled humidity atmosphere.

One treatment which produces this change consists of conveying the interlayer through a 167° Fahrenheit, 22 percent relative humidity atmosphere for 12 minute, then through a first bath of water maintained at a temperature of 107° Fahrenheit and a second bath of water at a temperature of 66° Fahrenheit.

To insure that the desired moisture content is obtained, it has been found necessary to cause the 167° Fahrenheit, 22 percent relative humidity, atmosphere to flow across the surface of the interlayer at a velocity of 80 to 150 feet per minute. This, of course, can be accomplished by suitable blowing means within the controlled atmosphere chamber.

Surface water is removed from the interlayer by rollers and the interlayer is stored in an atmosphere maintained at a temperature between 60° and 75° Fahrenheit and relative humidity of 27 percent until it is assembled with other components for lamination. The conditioned interlayer may be exposed to this ambient temperature and this humidity in the assembly area for extended periods without significantly changing the moisture content.

Adhesion control, although beneficial insofar as it has been employed, is limited in application. The degree of adhesion can be reduced only moderately unless other desirable aspects of laminated safety glass are to be sacrificed. If the degree of adhesion is substantially reduced, the interlayer may not adequately retain broken glass particles when the laminate is broken. The laminate may also become less stable to heat and the edges less durable to weather exposure.

It has also been suggested that laminated windshields should be discarded in favor of single ply windshields which have been strengthened by means of a thermal or chemical strengthening technique such as those presently employed for side and rear windows in automobiles. Such glasses are stronger than conventional laminated glass and will withstand greater stresses before breaking. When broken, these glasses disintegrate into a large number of very small particles, none of which has sharp edges and thus, serious passenger lacerations are avoided.

After breakage, strengthened glass has no penetration resistance. With a conventional laminate, although less force is required to fracture the glass, additional energy is required to penetrate the laminate. The sum of the forces required to penetrate a conventional laminate is greater than that required to fracture a single ply of strengthened glass of equivalent total thickness.

It has also been established that concussive injuries are prevalent in automobiles involving windshield contact. If windshields comprising single plies of strengthened glass were employed, it is conceivable that a large proportion of the concussive injuries presently sustained would become dangerous to life.

FIGURE 1 illustrates a "Human Tolerance to Head Impact Curve" (Human Tolerance to Impact Conditions as Related to Motor Vehicle Design—SAE J885, SAE Handbook Supplement, 1964) developed as a result of tests conducted with cadavers at Wayne State University, Detroit, Mich.

Severity of a concussive injury is proportional to the resultant force on the head upon impact. The curves shown in FIGURE 1 and subsequent figures were developed by determining the mean average deceleration force in "G's" (G=32.16 feet per second$^2$) for a particular time interval after impact and plotting the mean average force versus the absolute value of the time interval as it appears on the abcissa of the graph shown in FIGURE 1.

The Wayne State "Human Tolerance to Head Impact Curve" (HTC) is illustrated in FIGURE 1 as a heavy broken line. Concussive injuries sustained from impacts having a "Deceleration Force-Time" curve that traverses the "HTC" curve, i.e., extends into the shaded area of the graph in FIGURE 1, are considered "dangerous to life." Conversely, those curves plotted in the nonshaded area of the graph are considered "nondangerous to life."

In FIGURE 1, the "Deceleration Force-Time" curve for a simulated conventional laminated safety windshield is illustrated as curve "CLW." A curve "HPRW" is also shown for a simulated windshield laminated with a .030 inch thick "HPR" polyvinyl butyral interlayer. Both test panels were 24-inch by 36-inch laminates consisting of a ⅛ inch annealed plate glass ply, the interlayer, and another ⅛ inch annealed plate glass ply.

The "Deceleration Force-Time" curve data were obtained by impacting the test panels with a 22-pound headform having an accelerometer mounted therein. Impact was accomplished by dropping the headform onto the test panels from various heights. The test panels were supported horizontally, the impact angle was thus 90°

The conventional laminated windshield and the "HPR" laminate resisted penetration at velocities up to and including 9 and 23 miles per hour, respectively, without inducing concussive forces "dangerous to life." A ³⁄₁₆ inch thick thermally tempered plate would resist penetration by the headform at velocities up to about 13 miles per hour, but the "Deceleration Force-Time" curves for impacts in the velocity range of 9 to 13 miles per hour traversed the "HTC."

Thus, on the basis of these studies, a windshield consisting of a single ply of ³⁄₁₆ inch strengthened glass is more "dangerous to life" because of potential concussive injuries than are conventional and HPR laminates. Hence strength along, although significant, is not the controlling criterion for safety.

It has also been suggested that thin chemically strengthened glass, i.e., 0.1 inch thick, be employed as the inner and outer glass plies of a laminated windshield. Thinner glass is more flexible and in conjunction with the interlayer, provides penetration resistance not obtainable with a windshield consisting of a single ply of thermally tempered ³⁄₁₆ inch thick glass. As mentioned above, a single ply of strengthened glass shatters leaving only a large number of small particles. One would assume that strengthened glass would break in a similar manner when employed as a glass component in a laminated structure. This assumption is correct for the glass ply receiving the initial impacting force. However, the break pattern of the strengthened glass ply opposite the surface receiving the initial impacting force is somewhat different from the conventional small particle break pattern attributable to strengthened glass. This difference is apparent in the area surrounding the location of the impacting forces. In this area, long thin glass splines radiate outward from the impact location.

The difference in break pattern is believed to be attributable to a rearrangement of stresses in the glass ply immediately prior to the time of breakage. The impacting force applied to the opposite surface of the laminate will be partially absorbed by the glass ply being impacted and the interlayer. Although this occurs very rapidly, there is a minute lag between the point in time when the one glass ply is initially impacted and when sufficient stress is transmitted to the opposite strengthened glass ply to produce breakage. During this period, the latter strengthened glass ply is caused to deform. Because of this deformation, and perhaps the adhesion to the interlayer, this ply of strengthened glass breaks, leaving long splines of glass radiating outward from the point of impact.

In the event of an automobile accident wherein a passenger would be thrown against and penetrate a windshield having both an outer and an inner ply of strengthened glass, the aforementioned long glass splines resulting in the outer ply of glass could cause severe lacerations or puncture wounds.

Each of these suggestions for providing a safer windshield provides certain advantages, but due to the many different types of accidents which may occur, none to date has resulted in a truly optimum safety glass windshield.

In light of the above difficulties and the diverse situations which may give rise to or occur during an automobile accident, it becomes apparent that there is no single parameter which can be optimized to produce a safer windshield. Indeed, in order for the resulting composite to react better to diverse situations than conventional laminates, it is necessary to incorporate different materials in a novel configuration. The invention to be described hereinafter, in contemplation of these problems, provides a novel transparent laminar structure having improved characteristics necessary for a safer windshield.

We have now discovered that a transparent safety laminate comprising two outer plies of glass and a plastic interlayer can be produced having the combined advantages of high penetration resistance as obtained in safety laminates having a reduced degree of bonding between the glass and interlayer, and glass particle retention and edge stability characteristics equal to that obtained in safety laminates having a higher degree of bonding. This is accomplished by independently controlling the degree of adhesion to be effected at preselected areas of the interfacing surfaces of the glass plies and interlayer.

More specifically, this invention is concerned with an improved transparent laminated safety glass comprising at least two plies of glass and a plastic interlayer wherein at least part of the inboard surface of one ply has less adherence, either directly or indirectly, to the interlayer in an intermediate area surrounded by the marginal area otherwise referred to as the marginal edge frame portion. Stated differently, the invention is concerned with the improvement in laminated safety glass wherein there is less adherence between the interlayer and an adjacent ply of glass in at least a portion of the intermediate area surrounded by the marginal area than there is in the marginal area. As stated hereinafter and in the claims, the terminology "adherence between a glass ply and the interlayer" is intended to refer to the effective adherence between the opposing surfaces of the ply of glass and the plastic interlayer, whether or not there is a thin intervening layer of plastic adhered to the inner surface of the outer glass ply.

One embodiment of the present invention consists of two outer glass plies and three intermediate sheets of polyvinyl butyral, two of which are uniformly bonded to the inner surfaces of the outer plies of glass, whereas the third sheet of polyvinyl butyral is positioned between the two sheets of polyvinyl butyral and bonded thereto only along the peripheral marginal area of the laminate. Such a laminate offers the edge stability and weather resistance of conventional safety glass laminates because of the strong edge bonding, the glass particle retention of conventional laminates due to the uniform bonding of the glass to continuous sheets of polyvinyl butyral and in addition, penetration resistance values heretofore unknown. This latter is believed due to the internal sheet of polyvinyl butyral which is not strongly bonded to the adjacent sheets of polyvinyl butyral over large interfacing areas thereof, thus constituting a tightly stretched material rigidly attached around its periphery and capable of diaphragmatic action unrestricted by the inner and outer plies of glass.

Another embodiment of the present invention consists of an outer ply of annealed glass uniformly bonded to a thin sheet of polyvinyl butyral and an inner ply of strengthened glass uniformly bonded to a sheet of HPR polyvinyl butyral, the outer and inner plies of glass being more strongly bonded together by means of the interlayer material only around the marginal portions of the windshield.

Several nonpolar organic halogen-containing compositions are suggested for treating at least part of the intermediate portion of at least one of the plies in the region surrounded by the strongly bonded marginal portion of the windshield to reduce the adhesion between certain adjacent plies in selected interior areas. Such suggested compositions include polyvinyl fluoride, tetrafluoroethylene and various silicones.

The present invention is further described with respect to the various embodiments thereof in the accompanying drawings.

In the drawings: FIGURE 1 shows the "Human Tolerance to Head Impact Curve" previously discussed.

FIGURE 2 shows a general view of a windshield fabricated in accordance with one or more of the teachings of the present invention.

FIGURES 3, 4 and 5 show cross sections of the windshield illustrated in FIGURE 1. Each of the cross sectional views depicts a specific embodiment of the present invention.

Figure 6:
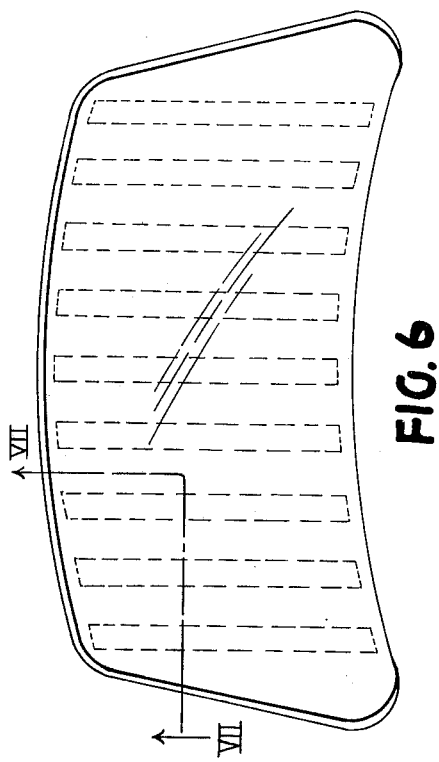

FIGURE 6 presents a general view of another windshield constituting a specific embodiment of the present invention.

Figure 7:
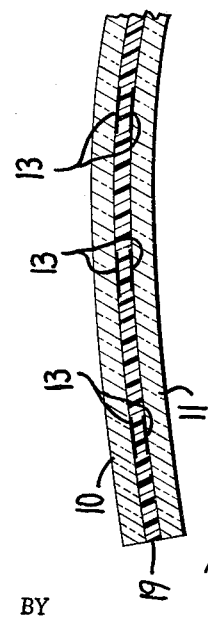

FIGURE 7 shows a cross section of the windshield illustrated in FIGURE 6.

Figure 8:
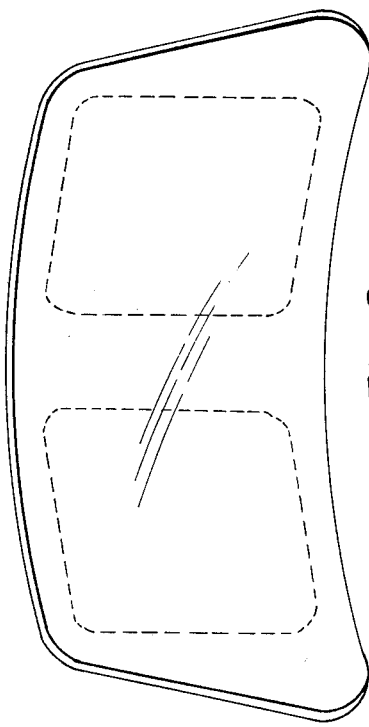

FIGURE 8 shows a general view of a windshield configuration illustrating another embodiment of the present invention.

Figure 9:
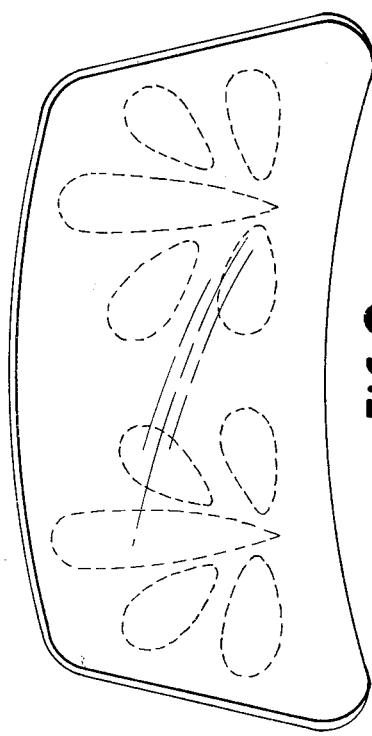

FIGURE 9 presents a general view of a windshield configuration illustrating a further embodiment of the present invention.

Figure 10:
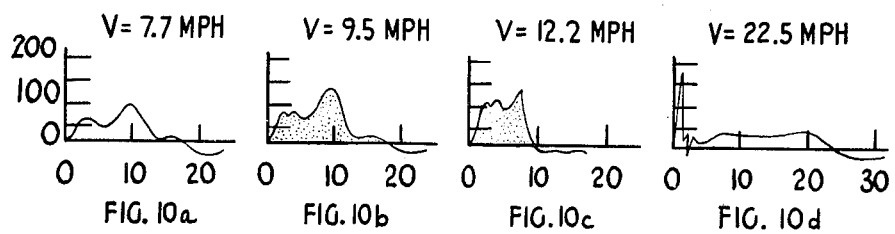
Figure 11:
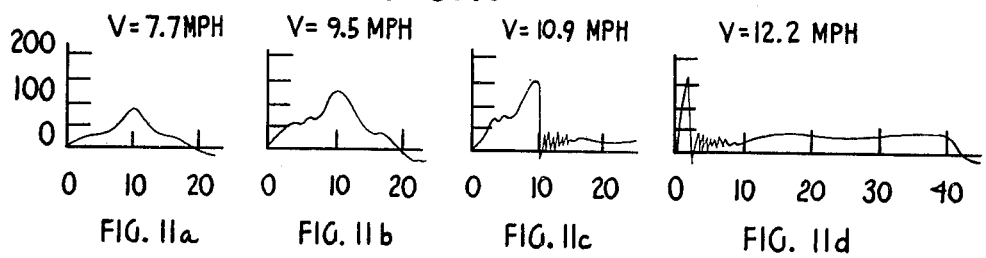
Figure 12:
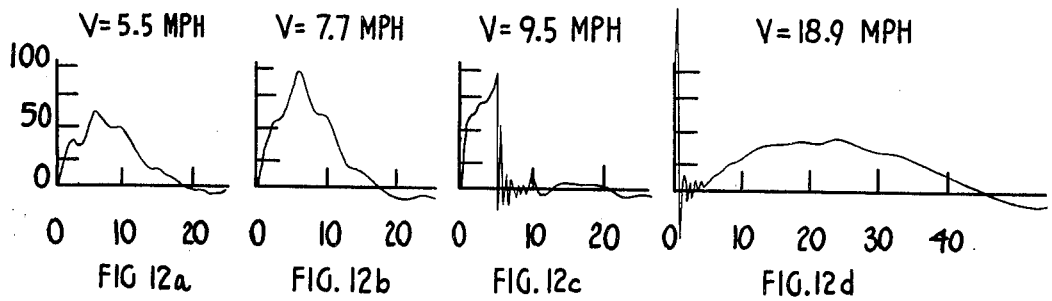

FIGURES 10, 11 and 12 depict "Declaration Force-Time" curves for various embodiments of the present invention.

Referring now to the drawings, various laminate configurations constituting different embodiments of the present invention will be described in greater detail.

FIGURE 2 shows a general view of a laminated windshield 1. Being transparent, the laminated windshield is illustrated by showing only the periphery thereof. For purposes of discussion, a broken line L is illustrated just within the periphery of laminated windshield 1. Broken line L is illustrated to delineate a marginal area m, that area or marginal edge frame portion which extends inward from the periphery of laminated windshield 1.

FIGURE 3 is a cross section of FIGURE 2 taken as though viewed along line III—III thereof, and illustrates a specific embodiment of the present invention.

The embodiment illustrated in FIGURE 3 comprises an outer ply of glass 10, an inner ply of glass 11, and an interlayer 12. Also shown is an intermediate area 13 which represents a portion of the interface between the outer ply of glass 10 and the interlayer 12 wherein the adhesion between the outer ply of glass 10 and the interlayer 12 in the area 13 is less than the adhesion that exists at the marginal area m of the same interface. It is understood that the adhesion between the inner ply 11 and the interlayer 12 may be reduced in the intermediate area 13 instead of or in addition to the reduction in adhesion between the outer ply 10 and interlayer 12.

FIGURE 4 illustrates a laminated windshield comprising an outer ply of glass 10, an inner ply of glass 11, and an interlayer comprising three sheets of plastic 14, 15 and 16. Also illustrated are two interface areas 13. Each interface area 13 represents an interface area between intermediate plastic sheet 15 and plastic sheet 15 and plastic sheets 14 and 16 having less adhesion than the adhesion effected at the interface between glass ply 10 and plastic sheet 14, or the adhesion effected between glass ply 11, and plastic sheet 16, or the adhesion effected at the marginal interface m of plastic sheets 14, 15 and 16.

FIGURE 5 illustrates still another laminated windshield structure comprising an outer ply of glass 10, an inner ply of glass 11, and an interlayer comprising a sheet of "HPR" polyvinyl butyral 18, and a thinner sheet of polyvinyl butyral 17. Also illustrated is an interface area 13 wherein the adhesion between polyvinyl butyral sheets 17 and 18 is less than the adhesion effected around the marginal portion m thereof. The degree of adhesion effected at interface area 13 is also less than the adhesion effected at the interface between glass ply 10 and polyvinyl butyral sheet 17, and the adhesion effected between glass ply 11 and polyvinyl butyral sheet 18.

Although the laminate configurations illustrated in FIGURES 2 to 5 differ, each embodiment can be fabricated by preparing the corresponding laminar assembly and laminating the same by means of a conventional laminating process.

A laminar assembly for producing a laminated windshield such as that illustrated in FIGURE 3 is prepared in the following manner:

The glass plies 10 and 11 are cut and bent to the desired shape and curvature. The inner ply of glass 11 is then positioned horizontally with the inner surface thereof facing downward. A sheet of "HPR" polyvinyl butyral 12 cut slightly larger than glass ply 11 is then positioned on the upper surface of glass ply 11. The polyvinyl butyral sheet 12 is smoothed out to eliminate air bubbles and positioned to extend over the periphery of glass ply 11. A film of polyvinyl fluoride approximately 0.0005 inch thick is then placed on top of the polyvinyl butyral sheet 12. The polyvinyl fluoride film is cut to such dimensions that its periphery is one to two inches short of the periphery of glass ply 11. The outer ply of glass 10 is then positioned on top of the thin film of polyvinyl fluoride. During this step the edges of the outer ply of glass are aligned as much as possible with the edges of the inner ply of glass 11. A slight pressure is applied to the assembly to eliminate air entrapped in the assembly and the excess marginal portion of the "HPR" polyvinyl butyral sheet 12 is removed with a sharp knife or razor blade. The laminar assembly for the windshield embodiment illustrated in FIGURE 3 is then ready for the lamination operation.

A laminar assembly for producing a windshield such as that illustrated in FIGURE 4 is prepared in the same manner as that described for the embodiment illustrated in FIGURE 3 with the following differences. The interlayer assembly of this embodiment consists of a first sheet of polyvinyl butyral approximately .015 inch thick, a film of polyvinyl fluoride approximately .0005 inch thick, a second sheet of polyvinyl butyral approximately .015 inch thick, a second sheet of polyvinyl fluoride approximately .0005 inch thick, and a third sheet of polyvinyl butyral approximately .015 inch thick. As in the above example, the polyvinyl butyral sheets are cut larger than glass plies 10 and 11 and are subsequently trimmed, whereas the polyvinyl fluoride films are cut to dimensions one to two inches shorter than the corresponding dimensions of glass plies 10 and 11.

The laminar assembly for producing a windshield such as that illustrated in FIGURE 5 is prepared in the same manner as that described above with the following interlayer assembly. The interlayer assembly of FIGURE 5 consists of a sheet of "HPR" polyvinyl butyral approximately .030 inch thick, a film of polyvinyl fluoride approximately .0005 inch thick, and a sheet of polyvinyl butyral approximately .007 inch thick. As in the earlier described assemblies, the polyvinyl butyral sheets are cut to dimensions slightly larger than the dimensions of the glass plies and subsequently trimmed to size, whereas the polyvinyl fluoride is cut to slightly smaller dimensions.

Each of the above laminar assemblies is then laminated in accordance with conventional laminating techniques.

During lamination, the interfaces between the glass components and polyvinyl butyral sheets, and the interfaces between the adjacent polyvinyl butyral sheet portions not separated by polyvinyl fluoride will be strongly adhered together as in a conventional laminate. However, the portions of polyvinyl butyral sheets separated by the thin film of polyvinyl fluoride will not be adhered together.

Adhesion in a conventional laminate results from polar bonding, i.e., hydrogen bridging, which occurs at the interfacing surfaces during lamination. Polyvinyl butyral is a "polar" material and will exhibit chemical adhesion when pressed against many materials. At the temperature and pressure employed in the laminating operation, it is thought that electrons associated with the hydrogen atoms in the polyvinyl butyral also become associated with atoms on the surface of the glass. This sharing of electrons thus produces the high degree of adhesion obtained in conventional laminates.

The polyvinyl fluoride film positioned between various components of the embodiments of the subject invention is a "nonpolar" material which does not readily adhere to other materials. Interposing such materials between the above mentioned components prevents the adjacent surfaces from being strongly adhered to each other. Emulsions of tetrafluoroethylene or silicones can also be employed to limit the degree of adhesion between the interfacing surfaces of components of a laminate.

A suitable emulsion of tetrafluoroethylene which can be employed for this purpose is "F.E.P. Fluorocarbon Resin, Clear Finish 856–200," marketed by E. I. du Pont de Nemours and Company, Inc., of Wilmington, Del. A thin film of this material can be applied to an interfacial surface of either the glass or the interlayer material by brushing, flowing or spraying during the assembly operation. Thicker films may reduce the optical properties of the resulting laminate to an undesirable level.

Methyloctadecyldichlorosilane Z–1222, a silicone compound marketed by Dow Corning Corporation of Midland, Mich., may also be employed in conjunction with the present invention. Using conventional spraying equipment, the silicone may be sprayed directly onto the interface area wherein a high degree of adhesion is not required. During spraying a suitable mask may be employed to shield those areas of the surface wherein a high degree of adhesion is to be effected during lamination.

Another solution identified as "Fluorochemical, L–1557," produced by the Minnesota Mining and Manufacturing Company of St. Paul, Minn., has also been employed as a parting material to restrict the degree of adhesion effected during lamination.

It may also be possible to chemically treat the interfacing surfaces of the laminate configurations to produce a predetermined low adhesion pattern in the resulting laminate.

An alternate method of producing a laminate such as that shown in FIGURE 2, employing a cast and cured-in-place polyurethane interlayer of the type disclosed in U.S. patent application Ser. No. 435,017, filed Feb. 24, 1965, and assigned to the assignee of the present invention, is as follows:

Glass plies 10 and 11 are cut to the desired shape and cleaned. A paper mask is then positioned over a one and one-half inch wide marginal portion $m$ of the inner surface of glass ply 10. A film of "Fluorochemical L-1557" is then applied by suitable spraying means to the inner surface of glass ply 10 over the intermediate area within the "masked" marginal portion thereof.

The paper mask is removed and glass plies 10 and 11 are assembled into a casting cell such as that illustrated in said U.S. patent application Ser. No. 435,017. An interlayer composition such as that disclosed as Composition A of Example 6 of said U.S. patent application Ser. No. 435,017 is cast into the cell and cured for 2 hours at 285° Fahrenheit.

During curing, the cast-in-place interlayer will uniformly adhere to the inner surface of glass ply 11 and the marginal area $m$ of the inner surface of glass ply 10. However, the "Fluorocarbon L-1557" film applied over the intermediate area within marginal portion $m$ of the inner surface of glass ply 10 will limit the degree of adhesion effected at that intermediate interfacial area of the laminate during curing, thereby producing low adhesion interface area 13.

FIGURES 6, 7, 8, and 9 show further embodiments of the present invention. In these embodiments the windshield is assembled and laminated in the same manner as the embodiments illustrated in FIGURES 3, 4, and 5. The primary difference is that FIGURES 6, 7, 8, and 9 illustrate windshields wherein the interface areas having a lesser degree of adhesion are established in a predetermined pattern.

FIGURE 6 shows a general view of a laminated windshield having a plurality of rectangular interface areas wherein the degree of adhesion effected during lamination is less than the adhesion effected in the surrounding areas.

FIGURE 7 is a cross section view taken along line VII—VII of FIGURE 6. This embodiment of the invention comprises an outer ply of glass 10, an inner ply of glass 11, and an interlayer 19. Also illustrated are interface areas 13 wherein a lesser degree of adhesion is effected between glass plies 10 and 11 and interlayer 19 during lamination than is effected at the remaining areas of the interfaces.

These low adhesion interface areas may be obtained by inserting rectangular strips of polyvinyl fluoride between the interlayer 19 and glass plies during the laminar assembly operation.

FIGURES 8 and 9 illustrate additional low adhesion area patterns which may be produced in a laminated windshield. In these figures the areas within the broken lines represent the low adhesion interface areas between at least one of the glass plies and the interlayer. These lower adhesion areas may be obtained by inserting precut thin polyvinyl fluoride patterns between the desired interfacing surfaces of the laminar assembly. In the alternative, they may also be produced by coating one of the interfacing surfaces with a thin coating of a material that will provide a desired level of adhesion that is less than the marginal adhesion. Examples of suitable coating materials are methyloctadecyldichlorosilane Z-1222 or "Fluorocarbon L-1557."

Penetration resistance tests conducted on various laminate configurations indicate that the configurations illustrated in FIGURES 4 and 5 provide improved penetration resistance.

The penetration resistance test consists of positioning a series of 12-inch by 12-inch samples of various laminate configurations in a device which rigidly holds them at a 45° angle with the horizontal, dropping a 5-pound steel ball on the samples from various heights, and observing whether the ball fractures the laminate and if it does, whether or not it completely penetrates the sample. The 45° angle was selected to approximate the angle at which a passenger's head would impact a windshield in a vehicle.

The ability of a particular laminate configuration to resist fracture and penetration is dependent upon the velocity of the steel ball at the time of impact. Knowing the distance the ball has dropped, the velocity of the ball at the time of impact can be calculated.

There is a drop height and ball velocity at which the ball will penetrate all of the samples of a particular laminate configuration which are subjected to the test. Likewise, there is a lower height and velocity where none of the samples of a particular laminate configuration will be penetrated when subjected to the test. Between these drop heights and corresponding velocities there is a transition range where at any given velocity, the steel ball will penetrate a percentage of the samples tested. The velocity at which 50 percent of the samples of a particular laminate configuration will be completely penetrated by the steel ball has been selected as the Mean Penetration Velocity to provide a meaningful value for comparing the results of the tests conducted on the laminate configurations tested.

For each laminate configuration tested, eighteen 12-inch by 12-inch samples were prepared. Three to five samples of each set of eighteen samples were employed to determine the transition range of drop heights wherein the steel ball would penetrate only a portion of the samples tested. The remaining samples were then subjected to the test, dropping the steel ball from heights within the transition range to determine the Mean Penetration Velocity for the particular laminate configuration being tested.

The laminate configurations tested were selected to illustrate the relative behavior in terms of Mean Penetration Velocities of laminates conforming to prior art configurations as compared with laminates conforming to the teaching of the present invention.

TEST SERIES NO. 1—PRIOR ART

These samples, simulating conventional windshield configurations, consisted of two 12-inch by 12-inch outer plies of ⅛ inch thick annealed plate glass and a 0.015 inch thick polyvinyl butyral interlayer having a moisture content of less than 0.5 weight percent. The test samples were prepared in the following manner.

The components for each sample were manually assembled and pressed to remove excess air. Excess polyvinyl butyral extending out from the edges of the glass plates was removed with a sharp knife.

Each sample was then positioned in a silicone rubber bag containing a blanket heater. Electrical energy was supplied to the heater by means of a wire passing through the bag. With the exception of an air exhaust valve, the rubber bag was then sealed to effect an airtight enclosure. A vacuum line, maintained at a pressure of 26 inches of mercury, was then attached to the exhaust valve to remove excess air contained in the bag and reduce the pressure in the bag.

The rubber bag was evacuated for approximately 5 minutes and then the temperature of the blanket heater within the rubber bag was increased to 300° Fahrenheit. This temperature was held for 7 minutes to seal the edges of the sample. The heater was then turned off, the vacuum line disconnected, and the prepressed sample was removed from the rubber bag.

The prepressed sample was then set aside until additional samples were prepressed and then several of the prepressed samples were subjected to final pressing in an oil autoclave.

The samples, suspended in a suitable rack, were immersed into the oil in the autoclave. The temperature of the oil at the time of immersion was approximately 100° Fahrenheit. The autoclave was sealed and the temperature of the oil increased to 300° Fahrenheit. The autoclave pressure was increased to 200 pounds per square inch. This temperature and pressure were held for approximately 25 minutes to laminate the sample. The temperature of the oil was reduced to 150° Fahrenheit, the pressure was released, and the samples were removed from the autoclave.

The samples were then washed with a detergent, rinsed in tap water and subjected to the penetration resistance test described above. The Mean Penetration Velocity for this laminate configuration which simulates the prior art conventional laminated windshield was 11.4 miles per hour.

TEST SERIES NO. 2—PRIOR ART

These samples, simulating the "HPR" windshields recently developed, consisted of two 12-inch by 12-inch outer plies of ⅛ inch thick polished plate glass and a 0.030 inch thick "HPR" polyvinyl butyral interlayer. The samples were assembled and laminated in accordance with the procedures discussed for Test Series No. 1, and subjected to the same test.

The Mean Penetration Velocity for this laminate configuration which simulates the prior art "HPR" windshield was 24.3 miles per hour.

TEST SERIES NO. 3—EMBODIMENT 1 OF PRESENT INVENTION

These samples, simulating an embodiment of the present invention such as that illustrated in FIGURE 4, consisted of a 12-inch by 12-inch by ⅛ inch thick thermally tempered glass ply, an interlayer system comprising a first sheet of 0.015 inch thick polyvinyl butyral, a 0.0005 inch thick film of polyvinyl fluoride, a second sheet of 0.015 inch thick polyvinyl butyral, another 0.0005 inch thick film of polyvinyl fluoride, and a third sheet of 0.015 inch thick polyvinyl butyral, and a 12-inch by 12-inch by ⅛ inch thick annealed plate glass ply. The polyvinyl fluoride film components of the interlayer system were approximately 10 inches square. During assembly, the polyvinyl fluoride films were centered with respect to the edges of the glass ply and the polyvinyl butyral components of the interlayer system were trimmed to the same dimensions as the glass plies. All polyvinyl butyral sheets had a moisture content of less than 0.5 weight percent.

The samples were then laminated in accordance with the procedures discussed for Test Series No. 1, and subjected to the 5-pound steel ball drop test with the tempered glass ply facing upward. In a passenger-windshield impact analogy, this arrangement would simulate a laminated windshield having a tempered inner ply of glass.

The Mean Penetration Velocity for this laminar configuration constituting one embodiment of the present invention was 37.9 miles per hour. This instituted a considerable increase over the Mean Penetration Velocity of 11.4 and 24.3 miles per hour respectively determined for the prior art conventional and "HPR" simulated windshield laminate configurations in Test Series Nos. 1 and 2.

TEST SERIES NO. 4—EMBODIMENT 2 OF PRESENT INVENTION

These test samples, simulating another embodiment of the present invention, were identical to the samples prepared for Test Series No. 3, with the exception that both plies of glass consisted of ⅛ inch thick annealed plate glass.

The Mean Penetration Velocity for this laminate configuration was greater than 38.3 miles per hour. This institutes a further improvement over the Mean Penetration Velocities determined for the simulated prior art laminate configurations tested in Test Series Nos. 1 and 2.

Unfortunately the height of the ball drop facility was limited to producing a maximum velocity of 38.3 miles per hour at the time of impact. Thus, the penetration resistance of this laminate configuration exceeded the capability of the test facility.

TEST SERIES NO. 5— EMBODIMENT 3 OF PRESENT INVENTION

These 12-inch by 12-inch samples, simulating an embodiment of the present invention such as that illustrated in FIGURE 5, consisted of a ⅛ inch thick thermally tempered glass ply, a multilayer interlayer system, and a ⅛ inch thick polished plate glass ply. The multilayer interlayer system consisted of a 0.007 inch thick sheet of polyvinyl butyral adjacent to the inner surface of the ⅛ inch polished plate glass ply, a 0.030 inch thick sheet of "HPR" polyvinyl butyral adjacent to the inner surface of the ⅛ inch thermally tempered glass ply, and a 10-inch by 10-inch by 0.0005 inch thick film of polyvinyl fluoride interposed between the polyvinyl butyral sheets and centered with respect to the edges of the glass plies.

The samples, assembled in the order just described, were laminated in accordance with the procedure described for the samples tested in Test Series No. 1. During lamination, the 0.007 inch thick polyvinyl butyral sheet was uniformly bonded to the inner surface of the ⅛ inch thick polished plate glass ply, the 0.030 inch thick "HPR" polyvinyl butyral was uniformly bonded to the inner surface of the ⅛ inch thick thermally tempered glass ply, and a 1 inch marginal portion of the inner surfaces of the polyvinyl butyral sheets were uniformly bonded together. However, because of the presence of polyvinyl fluoride film, the inner surfaces of the polyvinyl butyral sheets interior of the aforementioned 1 inch marginal portion were not bonded at all.

The test samples with the low adhesion interface areas were then subjected to the 5-pound steel ball drop test. During testing, the samples were positioned with the ⅛ inch tempered glass ply facing up.

The penetration resistance of this laminate configuration also exceeds the capability of the test facility.

The Mean Penetration Velocity of this embodiment of the present invention, constituting an improvement over the prior art laminate configuration, was greater than 38.3 miles per hour.

Table 1 summarizes the penetration resistance test results obtained for the 12-inch by 12-inch simulated windshield laminate configurations.

TABLE 1

| Test Series | 12-inch x 12-inch Simulated Windshield Configurations | Mean Penetration Velocity (miles per hour) |
|---|---|---|
| No. 1 | Prior art—Conventional | 11.4 |
| No. 2 | Prior art—"HPR" Interlayer | 24.3 |
| No. 3 | Embodiment 1 of the present invention | 37.9 |
| No. 4 | Embodiment 2 of the present invention | >38.3 |
| No. 5 | Embodiment 3 of the present invention | >38.3 |

The above data effectively illustrates that to be penetrated, Embodiments 1, 2 and 3 of the present invention comprising laminate configurations having low adhesion interface areas such as those shown in FIGURES 2 through 9, must be impacted at greater velocities than early conventional prior art windshields or the prior art "HPR" windshields more recently introduced.

The embodiments illustrated in FIGURES 2 through 9 also provide an improved "neck ruffle" condition after penetration, when annealed glass is employed for the outer ply 10 and a thin, i.e., ⅛ inch thick or less, thermally tempered or chemically strengthened glass is employed as the inner ply 11.

As illustrated in FIGURES 3 through 9, there is little if any adhesion between the outer glass ply 10 and the interlayer and inner glass ply 11 because of low adhesion interface area 13. This lack of adhesion enables fragments of the outer ply 10 to "break away" from the windshield whenever an object such as a passenger's head impacts the windshield with sufficient force to penetrate both the inner ply 11 and the interlayer, and fracture the outer ply 10. Thus, if fragments of the outer ply 10 are permitted to break free of the laminate in the area wherein penetration is achieved, there will be no sharp edges remaining beneath the area of penetration to produce severe lacerations.

The embodiments shown in FIGURES 4 and 5 illustrate additional improvements which further minimize the possibility of serious injury to passengers. Interlayer 14 in FIGURE 4, and interlayer 17 in FIGURE 5, are uniformly bonded to outer glass plies 10. These interlayers are thin polyvinyl butyral sheets, i.e., 0.005 to 0.015 inch thick, which perform the following functions. First, interlayers 14 and 17 retain fragments from the outer plies of glass 10, thereby reducing the possibility of injuries resulting from flying glass when fractured as a result of impact from the internal surface. These interlayers also serve to hold the outer glass ply intact whenever fractured as a result of impact on the outer glass ply.

Foremost, interlayers 14 and 17 serve to "break away" an area of the outer ply 10 much larger than the hole produced by penetration. For example, if a passenger's head penetrates the windshield configuration illustrated in FIGURE 5 with an impacting force that would produce a hole measuring 8 to 12 inches in diameter in a conventional windshield, a larger hole measuring 14 to 18 inches in diameter would result in the outer glass ply 10 of FIGURE 5.

This larger hole results because of the combined effect of low adhesion interface area 13 and thin polyvinyl butyral interlayer 17. Low adhesion interface area 13 permits the outer ply or glass to "break away" whenever this ply of glass is fractured. Thin interlayer 17 serves to restrain this "breakaway" action, thereby spreading the impacting force over a greater area of outer glass ply 10. However, interlayer 17 being only 0.007 inch thick does not completely resist the impacting force and eventually gives way to such force, but only after distributing the impacting force over a larger area of outer ply 10 and producing a larger hole in that ply. This is significant as a safety feature insofar as it removes a larger portion of the outer ply of glass 10 from the area of penetration, thereby reducing the possibility that the impacting passenger will experience severe lacerations.

The inner ply of thin strengthened glass serves a similar purpose. When broken, the inner ply of glass 11 in FIGURES 4 and 5 will disintegrate into a large number of small particles, none of which is very sharp, and held in place by the interlayer 16 or 18.

Until recently, only glasses having a thickness of 3/16 inch or greater could be strengthened. With the advent of chemical strengthening processes and substantial improvements in thermal tempering processes, thin glasses can now be strengthened. Glass having a thickness of 1/8 inch can now be thermally tempered. Chemical strengthening processes can be employed to strengthen glass of any practical thickness.

It has been discovered that these thin tempered glasses can be employed as the outer and inner plies of a safety windshield without inducing the "dangerous to life" concussive forces experienced with thicker tempered glasses. FIGURES 10, 11, and 12 illustrate this improvement.

In FIGURES 10a, 10b, 10c and 10d, "Deceleration" curves similar to those discussed in FIGURE 1 are plotted for the deceleration pulses measured when a 22-pound head-form is impacted at an angle of 90° against a 24-inch by 36-inch laminate comprising an inner ply of 3/16 inch thermally tempered glass, a multilayer interlayer system such as that illustrated in FIGURE 4 and incorporated in the samples tested as Embodiment 3 of the present invention in Test Series No. 5, and an outer ply of 1/8 inch thick annealed glass at the velocities, "V," indicated. The shaded curves in FIGURES 10b and 10c illustrate that the "Deceleration Force-Time" curve measured for velocities of 9.5 and 12.2 miles per hour traverse the "Human Tolerance Curve" of FIGURE 1 and are therefore potentially dangerous to life. At higher velocities, such as 22.5 miles per hour as illustrated in FIGURE 10d, fracture of the glass occurs almost instantaneously, thereby decreasing the possibility of severe concussive injury because the force is not applied for a sufficient length of time.

FIGURES 11a, 11b, 11c and 11d illustrate "Deceleration" curves comparable with those shown in FIGURE 10. The curves shown in FIGURE 11 were plotted from data obtained in the same manner as that described as applicable to FIGURE 10, with the exception that the test panels employed in the tests for FIGURE 11 consisted of inner and outer plies of 0.1 inch thick chemically strengthened glass. The glass plies were strengthened in accordance with the teachings of U.S. patent application Ser. No. 426,676, filed Jan. 19, 1965, now U.S. Patent 3,357,876, by Dale W. Rinehart, and assigned to the assignee of the present invention. The test panels of FIGURE 11 were impacted at velocities approximating and identical to those of FIGURE 10, but the "Deceleration Force-Time" curves of FIGURES 11a and 11d did not traverse the "Human Tolerance Curve" of FIGURE 1.

FIGURE 12 illustrates test results from the same test conducted on 18-inch by 30-inch test laminates consisting of inner and outer plies of 1/8 inch thick thermally tempered and the interlayer system incorporated in the samples tested as Embodiment 3 of the present invention in Test Series No. 5.

None of the "Deceleration Time" curves in FIGURE 12 traversed the "Human Tolerance Curve" of FIGURE 1.

The tests discussed above were selected from a number of tests conducted on various laminate configurations. With respect to the severity of potential concussive injuries, these tests indicate that the incorporation of a thin strengthened glass as the inner glass ply of the laminate configuration produces a windshield comparable to the prior art conventional and "HPR" windshields, and safer than comparable laminate configurations employing thicker strengthened glass plies.

The use of a thin strengthened glass as the inner ply, and annealed plate glass as the outer ply of a laminated windshield also avoids the potentially dangerous break pattern characterized by splines radiating out from the area of penetration in the outer glass ply which results from impacting and penetrating laminated windshields employing thin strengthened glasses for both the inner and outer plies of glass.

When embodiments of the present invention employing an inner ply of thin strengthened glass are impacted from the inside of the vehicle with sufficient force to fracture the inner strengthened glass ply, the inner ply will break into a large number of small particles, none of which has sharp edges. Because of this, the danger of incurring severe facial lacerations is reduced below that experienced with the conventional laminated safety windshield. The latter employs an annealed inner ply of glass which fractures into pieces having sharp edges capable of causing severe facial lacerations.

When employed in a laminate configuration having low adhesion areas between one or more of the interfacing surfaces, i.e., utilizing the "breakaway" concept, the thin strengthened inner ply offers a further advantage in the form of a safer "neck ruffle" around the area of penetration. This safer "neck ruffle" consists of a rolled-edge surrounding the area of penetration formed by the small particles of broken glass from the strengthened inner ply and the plastic interlayer.

The strengthened inner ply of glass also reduces the danger of passengers receiving injuries from "spalling."

With a strengthened inner ply of glass, a greater force must be applied to the outer ply to break the strengthened inner ply than that required to produce "spalling" in a laminate employing outer and inner plies of annealed glass.

A specific embodiment of the present invention taking advantage of the safety features described above consists of an outer ply of 1/8 inch thick annealed glass having a 0.007 inch thick sheet of polyvinyl butyral uniformly adhered to the inner surface thereof, an inner ply of 1/8 inch thick strengthened glass having an 0.030 inch thick "HPR" polyvinyl butyral sheet uniformly adhered to the inner surface thereof, the outer and inner plies of glass being sealed to one another by laminating the marginal portions only of the inner surfaces of the polyvinyl butyral sheets uniformly adhered to the inner surfaces of the outer and inner plies of glass. As discussed above, such marginal sealing may be effected by interposing a 0.0005 inch film of polyvinyl fluoride cut to a pattern having dimensions 1 to 2 inches less than the dimensions of the windshield pattern between the polyvinyl butyral sheets before the laminar assembly is subjected to a conventional windshield laminating operation.

We claim:

1. A tansparent, laminated windshield having a marginal edge frame portion extending inward from its entire periphery and an intermediate area surrounded by said marginal edge fame portion and comprising at least two plies of glass and an organic plastic interlayer ply, substantially coextensive with the glass plies and bonded together in the marginal edge frame portion and means for providing less adherence between adjacent plies in said intermediate area only.

2. A windshield according to claim 1, wherein said means providing less adherence is between the interlayer and said two plies of glass in at least a portion of the intermediate area only.

3. A windshield according to claim 1, wherein at least part of an interfacial surface of said interlayer within said intermediate area only is treated with a poor adhesive to reduce its adherence in said treated area.

4. A windshield according to claim 1, wherein at least part of an interfacial surface of at least one of said glass plies is treated with a poor adhesive within said intermediate area only to reduce its adherence to said interlayer in said treated area.

5. A windshield according to claim 1, said means comprising a film of material of lesser adherence to said plies than the adhesion between said plies disposed intermediate two of said plies in at least a portion of the intermediate area.

6. A windshield according to claim 5, wherein said film is interposed between said interlayer ply and at least one of said glass plies.

7. A windshield according to claim 5, further including at least one additional interlayer ply between said glass plies, wherein said film is disposed between adjacent interlayer plies in said intermediate area only.

8. A windshield according to claim 1 wherein one of said glass plies is strengthened.

9. A windshield according to claim 8 wherein the interlayer material comprises high penetration resistance polyviny lbutyral.

10. A windshield according to claim 9 wherein the glass ply other than said strengthened glass ply is bonded directly to a thin layer of adherent polyvinyl butyral which in turn is bonded to the marginal edge frame portion only of the high penetration resistance polyvinyl butyral interlayer.

11. A windshield according to claim 10 in which the strengthened glass ply is thinner than 1/8 inch.

12. A windshield as in claim 1, wherein said means providing less adherence between adjacent plies is a nonpolar organic halogen-containing composition.

13. A winshield as in claim 12, wherein said means providing less adherence between adjacent plies is tetrafluorethylene.

14. A windshield as in claim 12, wherein said means providing les adherence between adjacent plies is methyloctadecyldichlorosilane.

15. A transparent laminated windshield having a marginal edge frame portion extending inward from its entire periphery and an intermediate area surrounded by said marginal edge frame portion and comprising at least two plies of glass and a plastic interlayer ply of polyvinyl butyral, and a layer of polyvinyl fluoride disposed entirely within said intermediate area and between two adjacent plies of said plies to provide less adherence in said intermediate area only.

References Cited

UNITED STATES PATENTS

| | | | |
|---|---|---|---|
| 2,526,728 | 10/1950 | Burk et al. | 161—199 |
| 2,697,675 | 12/1954 | Gaiser | 161—192 |
| 2,725,320 | 11/1955 | Atkeson et al. | 156—102 |
| 3,160,925 | 12/1964 | Gort | 161—192 |
| 3,231,461 | 1/1965 | Mattimoe | 161—199 |
| 3,282,722 | 11/1966 | Hailstone | 156—106 |
| 3,317,710 | 5/1967 | Boicey et al. | 161—192 |
| 3,382,137 | 5/1967 | Schreiber et al. | 156—99 |

OTHER REFERENCES

Plastics, "Teflon Makes Its Debut," July 1946, pp. 32, 34 and 97.

WILLIAM J. VAN BALEN, Assistant Examiner

U.S. Cl. X.R.

156—99, 106; 161—165, 189 190, 192, 193, 199, 208, 248